June 26, 1962 W. E. MEYERHOF 3,041,455
APPARATUS FOR LOGGING NEUTRON-CAPTURE GAMMA RAYS
Filed Jan. 11, 1954 2 Sheets-Sheet 2

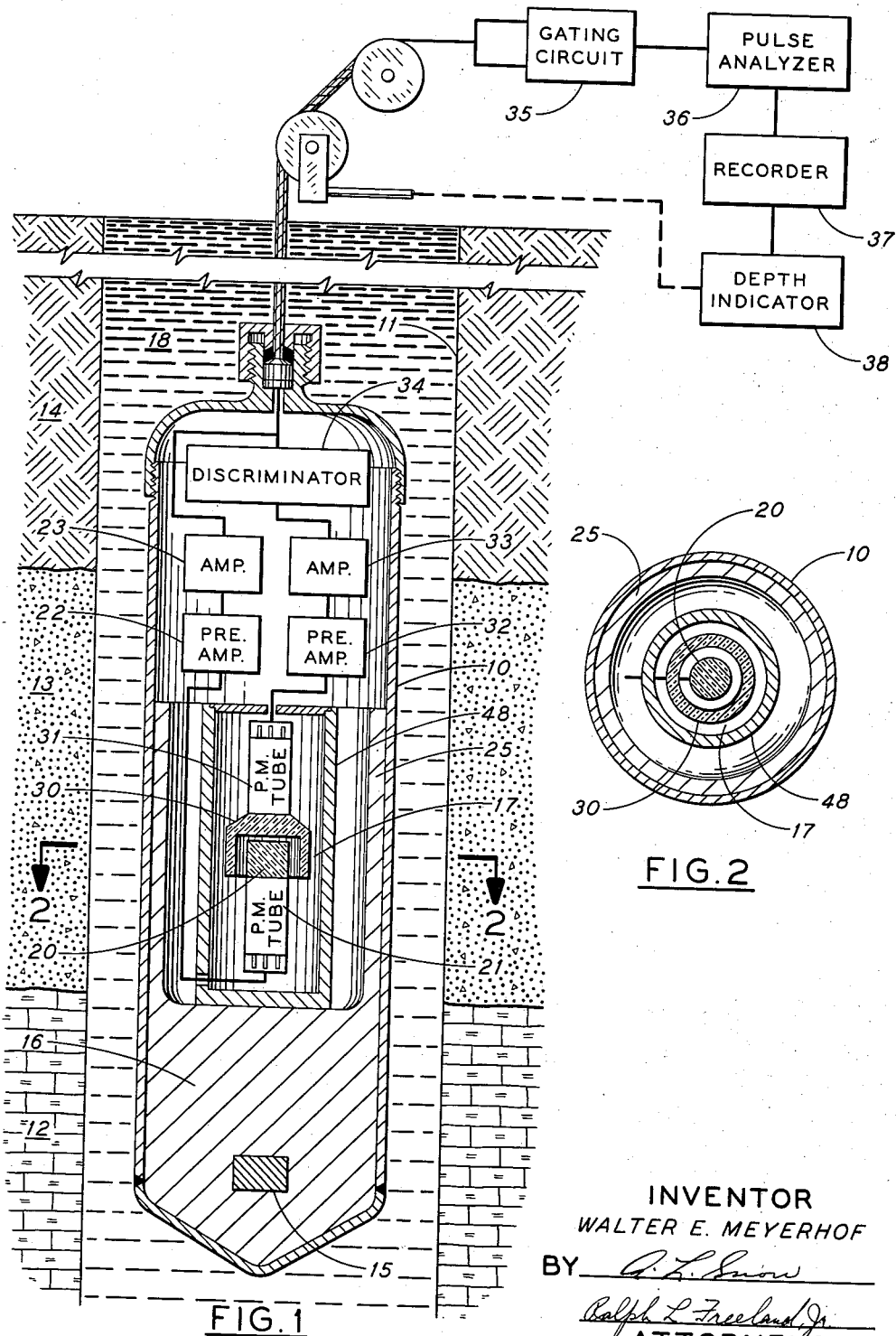

INVENTOR
WALTER E. MEYERHOF
BY
ATTORNEYS

United States Patent Office 3,041,455
Patented June 26, 1962

3,041,455
APPARATUS FOR LOGGING NEUTRON-CAPTURE GAMMA RAYS
Walter E. Meyerhof, Menlo Park, Calif., assignor to California Research Corporation, San Francisco, Calif., a corporation of Delaware
Filed Jan. 11, 1954, Ser. No. 403,263
7 Claims. (Cl. 250—71.5)

The present invention relates to apparatus for nuclear well logging and more particularly to apparatus for investigating the nuclear constituents of earth formations traversed by a well bore by identification of the characteristic neutron-capture gamma ray energy produced by nuclei of elements within the formation excited by the capture of neutrons, and has for an object the provision of an improved apparatus for identifying neutron-capture gamma rays by measurement of their characteristic energies when said gamma rays produce a positron-electron pair in a primary detector and substantially simultaneously emit annihilation radiation detectable in a secondary detector surrounding said primary detector.

While it has been proposed to investigate the constituents of earth formations traversed by a well bore by irradiating a formation with neutrons and then measuring the energy of the resultant gamma radiation that is produced in the formation and penetrates into the bore hole, such energy measurements have not been highly useful in the diagnostic evaluation of the nuclear constituents of the earth formation. The primary reason for the failure of previously known methods and apparatus for such analysis lies in the fact that the spectrum of the gamma radiation produced by neutron-bombardment of the formation is extremely complex and not resolvable into its characteristic components by such methods and apparatus. Additionally, a neutron source such as those commercially available, for example, radium-beryllium or polonium-beryllium, produces a high proportion of gamma rays to neutrons. Thus, when an earth formation traversed by a well bore is irradiated from such a source, the gamma rays emitted by the source are back-scattered by the formation to the detector at the same time that the neutrons emitted by the formation are striking target nuclei within the formation and generating neutron-capture gamma rays.

As disclosed in the co-pending application Serial No. 395,744, now Patent No. 2,888,568 of Stanley B. Jones, assignor to the assignee of the present application, the problem of detecting neutron-capture gamma rays originating in target nuclei within a formation during neutron bombardment of said formation has been simplified by an arrangement of shielding for the neutron source so that the formation may be irradiated with neutrons originating within the source while the detector is positioned sufficiently close to the source to detect the instantaneously emitted gamma rays. As particularly disclosed in said co-pending application, the detector is shielded by enclosing the source within a bismuth shield, thereby effectively stopping gamma rays emitted by the source from reacting with either the formation or the detector. Bismuth is a particularly desirable material for the shield surrounding the source because bismuth has a small neutron-capture cross-section.

As further disclosed in the co-pending Jones application, it has been found possible to facilitate the spectrum analysis by surrounding the detector with a thin shield of bismuth which shields preferentially against low-energy gamma rays which are not of value in the analysis. It has also been found advantageous to surround the detector with a shield of boron, to prevent thermal neutrons from entering the detector. Boron is a particularly desirable material for such a neutron shield, because it has a high neutron-capture cross-section and gives only low-energy gamma rays as the result of neutron capture.

In spite of the above shielding being provided in the well logging instrument, the gamma ray spectrum entering the detector is very complex, and the electrical pulse height spectrum generated in the detector is further complicated due to the multiplicity of interaction processes by which gamma rays are detected. As shown in the Jones' application, due to the different detection processes, the pulse height spectrum shows a continuum and three peaks for each gamma ray energy. As more fully described in the co-pending application Serial No. 399,275, filed December 21, 1953 of Stanley B. Jones, Thomas D. Mueller and Paul E. Baker, assignors to the assignee of the present invention, there is provided a method of and apparatus for gamma ray spectrum analysis in which the observed pulse height spectrum is simplified by eliminating from it all pulses corresponding to the continuum and two of the peaks, as will be described in connection with FIG. 3 of the drawings, thus leaving a pulse height spectrum having one peak for each gamma ray energy. In that method of spectrum analysis, only pulses falling in one of the peaks and preferably only those pulses having energies represented by peak C of FIG. 3 are counted. These pulses are caused by pair productions within the primary detector with the escape of both annihilation quanta from said detector.

In accordance with the present invention, there is provided apparatus for identifying constituent elements of an earth formation by detecting the characteristic gamma ray energies from nuclei in an excited state due to neutron capture when a positron-electron pair is produced in a center detector and both annihilation quanta are captured in an outer detector surrounding the center detector.

In a preferred form of apparatus for carrying out the invention, the first or center detector, desirably of the scintillation type, such as a crystal of thallium-activated sodium iodide, is positioned adjacent the formation at predetermined distance from the neutron-emitting source and in such a position that the instantaneously-emitted gamma rays produced as a result of neutron capture by the constituent elements of the formation may be directly received at said first detecting crystal. Further, in accordance with the invention, the outer detector is positioned adjacent to and surrounds the first detector so that annihilation quanta produced by annihilation of the positron of the positron-electron pair in the first detector upon escaping from the detector may be detected in the second detector to trigger the measurement of the energy of the gamma ray in the first detector. Circuit means for electrical pulse analysis are provided for each of the two detectors. Coincidence circuitry is provided so that a pulse in the first detector will be recorded only when annihilation quanta are detected in the second detector substantially simultaneously with the occurrence of the pulse in the first crystal. This coincidence requirement thus assures that a pulse in the first detector is recorded only if the pulse is caused by pair production with the escape of both annihilation quanta. Pulses thus produced are measured, counted, and recorded, according to their voltages to produce a pulse height spectrum having one peak for each gamma ray energy. In well logging, the pulse height spectrum is recorded in accordance with the depth of the detector in a well bore.

In a preferred form of apparatus for carrying out the present invention, the neutron-capture gamma ray spectral energy measurements for identifying the constituent elements of an earth formation are made by a cylindrical first detector crystal within which said positron-electron pairs are produced upon interception of high-energy neutron-capture gamma rays. This cylindrical crystal is surrounded by a second detector crystal having substantially an annular form within which the positron-electron pair gamma radiation may be detected. The coincidence circuity is arranged to measure only those electrical pulses produced by the first crystal when both annihilation quanta are captured in the annular crystal.

Further objects and advantages of the present invention will become apparent from the following detailed description, taken in conjunction with the accompanying drawings, which form an integral part of the present specification.

In the drawings:

FIG. 1 is a schematic representation of a preferred form of apparatus for carrying out the present invention and particularly illustrates the arrangement of the detector crystals relative to the neutron source in a vertical, sectional view of a logging sonde.

FIG. 2 is a cross-sectional view in the direction of arrows 2—2 in FIG. 1, further illustrating the crystal detector arrangement.

Figure 3:
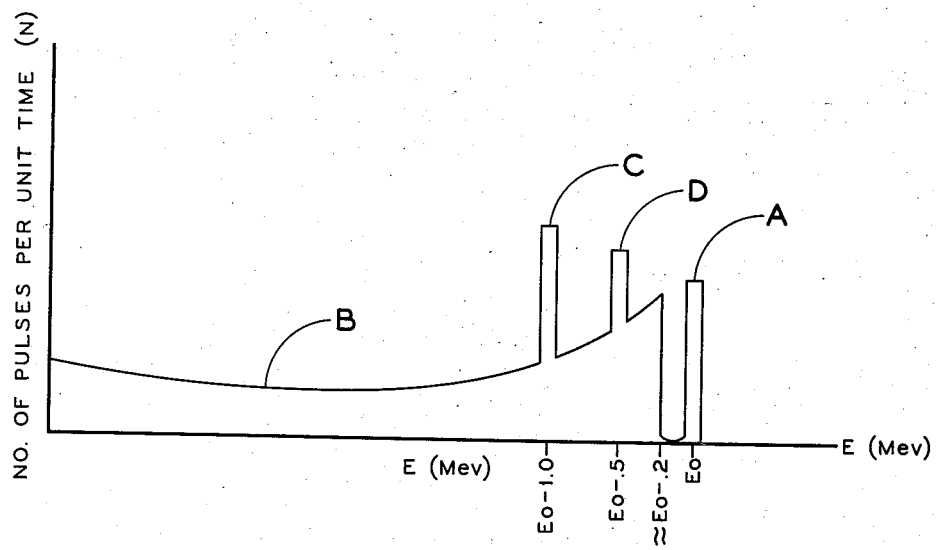

FIG. 3 is a graph useful in explanation of the operation of the apparatus of FIGS. 1 and 2, showing the energy spectrum of scintillations produced by monoenergetic gamma rays in a detector crystal, such as thallium-activated sodium iodide. This figure may also be considered as an idealization of the voltage spectrum of the electrical pulses resulting in a single crystal scintillation spectrometer due to the detection of monoenergetic gamma rays.

Referring now to the drawings, and in particular to FIGS. 1 and 2, there is illustrated in these figures a preferred form of apparatus for carrying out the present invention. As illustrated, a logging sonde 10 is adapted to traverse a well bore 11 which has penetrated earth formations such as 12, 13, and 14, whose nuclear constituents, including both fluid and solid materials, are to be identified by the characteristic gamma rays emitted by nuclei in the formations in an excited state due to capture of neutrons radiated into the formations from source 15. Source 15 is positioned within shield material 16, which is desirably bismuth, for reasons explained above, so that the source may irradiate the formation with neutrons while the detector arrangement 17 is vertically positioned a predetermined distance from source 16. Detector 17 is located sufficiently close to the formation and the source to detect instantaneously-emitted neutron-capture gamma rays originating within the formation when irradiated by a neutron source.

As mentioned hereinabove, detector arrangement 17 is particularly adapted to detect neutron-capture gamma rays of high energy, such that, upon absorption within a crystal, they may produce a positron-electron pair to which the energy of the gamma ray is imparted. As further discussed above, such neutron-capture gamma ray energy is detected in a first detector of the scintillation crystal type, which in the arrangement of FIGS. 1 and 2, is central cylindrical crystal 20. In the preferred form of apparatus, crystal 20 is a crystal of sodium iodide activated by thallium wherein gamma rays of the neutron-capture type may be intercepted. These high energy gamma rays in crystal 20 produce scintillations wherein a total number of light photons are emitted proportional to the energy that the incoming gamma ray imparts to the crystal. This energy, as represented by the total number of light photons, may be converted into an electrical signal of corresponding amplitude by means of photomultiplier tube 21 and preamplifier 22.

As particularly shown in FIG. 2, crystal 20, as well as concentric, annular, crystal 30 are positioned within a cup portion 25, which is an upward extension of the bismuth shield 16 so that low-energy gamma rays may be excluded from crystals 20 and 30. A boron shield 48 is provided to prevent thermal neutrons from entering the detector crystals.

In accordance with the present invention, crystal 30 is so positioned with respect to central or primary crystal 20 that the radiation quanta due to annihilation of the positron of the positron-electron pair generated within crystal 20 may both be detected in crystal 30. Said annihilation radiation is in the nature of a pair of gamma rays transmitted at 180 degrees with respect to each other when said positron combines with an electron. These annihilation-type gamma rays each have an energy of substantially 0.51 mev., and it is the purpose of crystal 30 to intercept and detect these annihilation quanta. In a preferred manner of operating the apparatus the energy measurement at crystal 20 is made only when both annihilation quanta are simultaneously detected in crystal 30 and produce a pulse representing energy of 1.02 mev.

Electrical pulses produced in the circuits of the detectors, as a result of gamma ray detection in crystals 20 and 30, are amplified in amplifiers 23 and 33 and those from amplifier 33 passed to discriminator 34. This discriminator is desirably pre-set to pass only those pulses, produced in photomultiplier 31, and preamplifier 32, whose voltages fall in a narrow range of values corresponding to a narrow energy range which includes the value 1.02 mev. Pulses that are passed by this discriminator are transmitted to gating circuit 35. This circuit includes a coincidence circuit which is activated only when it receives pulses of the predetermined magnitude from discriminators 34 and simultaneously receives pulses to be measured from amplifier 23. When such coincidence occurs, gating circuit 35 is prepared to transmit pulses from the central amplifier 23 to pulse analyzer 36. Thus, pulses from amplifier 23 are permitted to pass the gate and enter pulse analyzer 36 only when they occur in coincidence with a simultaneous pulse, of amplitudes corresponding approximately to 1.02 mev., in the outside detector. Pulses in the central detector, when occurring in the required coincidence, are separated according to their amplitudes by the pulse analyzer 36, and a record of the number of pulses per unit time, as a function of pulse amplitude is shown on recorder 37, on which a record is simultaneously shown of the depth of the logging sonde as determined by depth indicator 38.

It will be understood that, with the arrangements of FIGS. 1 and 2, the center crystal 20 may also be used to identify neutron-capture gamma rays having an initial energy characteristic of one of the formation elements when only one gamma ray of ½ mev. is detected in annular crystal 30. Accordingly, it will be understood that with the arrangement of FIGS. 1 and 2, the amplitude of pulses accepted by the secondary discriminator may be that corresponding either to ½ mev. or to 1 mev. If ½ mev. pulses are accepted, the pulse spectrum shows two peaks for monoenergetic gamma rays, the peaks corresponding to the gamma ray energy minus 1 mev. identified as peak C in FIG. 3 and the gamma ray energy minus ½ mev. identified as peak D. If 1 mev. pulses are accepted, the pulse height spectrum shows one peak for monoenergetic gamma rays; the peak corresponding to the gamma ray energy minus 1 mev.

The crystals are surrounded by a reflecting material and sealed to the face of the photomultiplier tube so that high efficiency of light transmission is obtained and the resulting proportional electrical signal, representative of the energy dissipated in the crystal by the gamma rays detected therein, may be measured as accurately as possible.

The particular purposes and advantages of apparatus constructed in accordance with the present invention for use in gamma ray spectroscopy will be further understood in reference to FIG. 3. There is illustrated in FIG. 3, the scintillation energy spectrum produced by monoenergetic gamma rays in a single crystal. As there shown, the complexity of this spectrum results from the multiplicity of types of interactions occurring between the detected gamma rays and the scintillation crystal. It is to be remembered that the energy of the scintillation does not correspond directly to the energy of the gamma ray producing the scintillation, but to the amount of energy imparted to the crystal in the interaction between the gamma ray and the crystal. The energy thus imparted to the crystal by a gamma ray quantum is sometimes the total gamma ray energy and sometimes less than the total, depending on the particular kind of interaction. The relative frequencies of occurrence of the different kinds of interactions follow well known laws of probability, depending upon the energy of the incident gamma ray and upon the material of which the crystal is composed and the size of the crystal. The monoenergetic gamma ray quanta producing the illustrated scintillation spectrum all have initial energy $E_0$.

In FIG. 3, for a single crystal, the continuum B is provided by Compton effect collisions, in which the energy transferred from the gamma ray to the crystal may have any value between zero and approximately $E_0-0.2$ mev. The scintillations falling in peak C are due to pair production with the escape of both annihilation quanta. Peak D is due to pair production with the absorption in the crystal of one of the annihilation quanta. Peak A, in which the scintillations have the full energy of the incident gamma ray quanta, is due partly to absorption of the incident gamma rays by the photoelectric effect, partly by single or multiple Compton scattering followed by the photoelectric effect, and partly by pair production accompanied by the absorption of both annihilation quanta.

In a single crystal scintillation spectrometer, the actual pulse height spectrum, that is, the voltage distribution of the pulses entering the pulse analyzer, is qualitatively the same as the scintillation energy spectrum of FIG. 3 but with the important practical difference that the peaks are much wider in the pulse height spectrum. The spreading of the peaks is due to imperfect correspondence between scintillation energy and electrical pulse voltage.

The gamma ray spectrum to be analyzed in the well logging apparatus to which this invention relates is composed of several monoenergetic groups of gamma rays plus a continuum. One objective in this well logging apparatus is to determine the energy of each monoenergetic group of gamma rays. Such a determination constitutes a spectrum analysis, and it is seen from the foregoing, and from the discussion in the above-mentioned Jones, Mueller and Baker application, that the gamma ray spectrum analysis is not direct, but is inferred from the analysis of the pulse height spectrum. Thus, a prime advantage of the present apparatus for gamma ray spectrum analysis herein described will now be readily seen: if the gamma ray spectrum itself has several monoenergetic groups, and each monoenergetic group produces, in the pulse height spectrum, three peaks, the use of these peaks to identify the groups of gamma rays is complicated, and further, the spreading of the peaks will cause some of them to disappear. In accordance with the present invention, only one peak, or at most two, occurs in the pulse height spectrum for each monoenergetic group of gamma rays. The inference of the gamma ray spectrum and the constituent elements from the pulse height spectrum is thus greatly simplified, and also the chances of having peaks lost due to their overlapping is greatly reduced.

From the foregoing description of the preferred form of apparatus, it will be appreciated that there is provided means for detecting the presence of constituent nuclei in earth formations traversed by a well bore which includes means for positioning a first detector adjacent said formation to sense the arrival of neutron-capture gamma rays instaneously emitted by nuclei of elements in an excited state within the formation when such nuclei capture neutrons from a neutron source. Means for measuring the resultant energy of said neutron-capture gamma rays in said first detector are then actuated only when there is detected in another detector adjacent to and surrounding the first detector, and coincidentally-occurring therewith, annihilation radiation produced as a result of the annihilation of the positron from a positron-electron pair produced in the first detector. Means for recording the number of pulses in unit time from a given earth formation permits the nuclear constituents of the formation to be identified by the charactertistic gamma ray energies particularly indicative of those constituents.

While crystals 20 and 30 have been shown in the arrangement of FIGS. 1 and 2 to be cylindrical, various other configurations such as square, polygonal or others may be used, but preferably in all cases the one crystal, such as 20, will be substantially enclosed within the outer crystal, such as 30.

While various modifications and changes in the single form of apparatus disclosed in the present application will occur to those skilled in the art, all such modifications and changes which fall within the scope of the appended claims are intended to be included therein.

I claim:

1. Apparatus for identifying the constituent elements of an earth formation traversed by a well bore comprising a neutron source for irradiating an earth formation, a pair of scintillation crystals positioned a predetermined distance from said source and shielded therefrom, one of said crystals being positioned within a cavity in the other of said crystals, shielding means between said earth formation and said pair of crystals to exclude therefrom radiation originating in said earth formation having energy less than a predetermined magnitude pulse generating circuit means for each of said crystals for converting radiation energy detected by each of said crystals to electrical pulses proportional in amplitude to said detected energy, gating circuit means connected between said pulse generating circuit means for the inner crystal of said pair and a measuring circuit for controlling passage of the electrical pulses generated by said inner crystal, discriminator means connected between said pulse generating circuit means for the outer crystal of said pair and said gating circuit, said discriminator means including means responsive to electrical pulses corresponding in energy to a predetermined magnitude being detected in the outer of said crystals for controlling the operation of said gating circuit means and means for operating said gating circuit means upon occurrence of coincident electrical pulses from the generating circuit means for said inner crystal and from said discriminator means, and means for recording the number of electrical pulses of predeterminable magnitude corresponding to energy measured in said inner crystal in accordance with the depth of said crystals in a well bore as a measurement of the quantity of a constituent element in said earth formation traversed by the well bore.

2. Apparatus in accordance with claim 1, which includes means for adjusting said discriminator means to permit said gating circuit means to pass electrical pulses from said inner crystal to said recording means when the coincident electrical pulse from the outer crystal corresponds to the energy of at least one annihilation quantum.

3. Apparatus in accordance with claim 1 which includes means for adjusting said discriminator means to permit said gating circuit means to pass electrical pulses from said inner crystal when said outer crystal detects radiation energy corresponding to two annihilation quanta occurring coincidentally with the pulse from said inner crystal.

4. Apparatus for identifying the constituent elements of an earth formation traversed by a well bore comprising means for exciting the nuclei of constituent elements in an earth formation to transmit gamma rays of characteristic energy therefrom, means for measuring said characteristic energy comprising a pair of scintillation crystals positioned to intercept gamma rays, one of said crystals being substantially surrounded by the other of said crystals, shielding means intermediate said nuclei exciting means and said pair of crystals and surrounding the outer crystal of said pair to exclude from both of said crystals gamma rays originating in said earth formation having energies less than a predetermined magnitude, pulse generating circuit means for converting radiation energy detected by each of said crystals to individual electrical pulses each proportional in amplitude to the energy detected by its originating crystal, gating circuit means connected between said pulse generating circuit means for the inner crystal of said pair and a measuring circuit for controlling passage of the electrical pulses generated by said inner crystal, discriminator means connected between said pulse generating circuit means for the outer crystal of said pair and said gating circuit, said discriminator means including means responsive to electrical pulses corresponding in energy to a predetermined magnitude being detected in the outer of said crystals for controlling the operation of said gating circuit means and means for operating said gating circuit means upon occurrence of coincident electrical pulses from the generating circuit means for said inner crystal and from said discriminator means, and means for recording the number of electrical pulses of predeterminable magnitude corresponding to the energy measured in said inner crystal in unit time and in accordance with the depth of said crystals in a well bore as a measurement of the quantity of a constituent element in said earth formation traversed by the well bore.

5. Apparatus for identifying the constituent elements of an earth formation traversed by a well bore comprising means for exciting the nuclei of constituent elements in an earth formation to transmit gamma rays of characteristic energy therefrom, means for measuring said characteristic energy comprising a pair of scintillation crystals positioned to intercept gamma rays, one of said crystals being substantially cylindrical and the other of said crystals having a cylindrical shell-like configuration to receive said cylindrical crystal, shielding means intermediate said nuclei exciting means and said pair of crystals and surrounding the shell-like crystal to exclude from both of said crystals gamma rays originating in said earth formation having energies less than a predetermined magnitude, photomultiplier tube means for each of said crystals disposed coaxially with the axes of said crystals, amplifying means for developing the electrical pulses generated by each of said crystals and said photomultiplier tube means to produce a measurable signal proportional in amplitude to the energies detected by each of said crystals, gating circuit means connected between said amplifying means for said cylindrical crystal and a measuring circuit for controlling passage of the electrical pulses generated by said cylindrical crystal, discriminator means connected between said amplifying means for said shell-like crystal and said gating circuit, said discriminator means including means responsive to electrical pulses corresponding in energy to a predetermined magnitude being detected in said shell-like crystal for controlling the operation of said gating circuit means, and means for operating said gating circuit means upon occurrence of coincident electrical pulses from said amplifying means for said cylindrcal crystal and from said discriminator means, and means for recording the number of electrical pulses of predeterminable magnitude corresponding to the energy measured by said cylindrical crystal in unit time and in accordance with the depth of said crystals in a well bore as a measurement of the quantity of a constituent element in said earth formation traversed by the well bore.

6. Apparatus for identifying the constituent elements of an earth formation traversed by a well bore comprising means for exciting the nuclei of constituent elements in an earth formation to transmit gamma rays of characteristic energy therefrom, means for measuring said characteristic energy comprising a pair of scintillation crystals positioned to intercept gamma rays, said crystals being substantially cylindrical and coaxially nested with respect to each other, shielding means intermediate said nuclei exciting means and said pair of crystals and surrounding the outer crystal of said pair to exclude from both of said crystals gamma rays originating in said earth formation having energies less than a predetermined magnitude, photomultiplier tube means secured to the oppositely disposed end faces of said crystals and isolated optically from each other, amplifying means for each of said photomultiplier tube means for producing electrical pulses proportional in amplitude to the radiation energies absorbed by said crystals, gating circuit means for controlling the passage of electrical pulses generated in response to radiation energy absorbed in the inner crystal to a pulse height measuring means, gating circuit operating means including discriminator means responsive to the arrival of electrical pulses from the amplifying means for the outer crystal which are of a predetermined magnitude, each corresponding to annihilation radiation being detected by the outer crystal, means for measuring the height of each pulse from said amplifying means for the inner crystal passed by said gating circuit upon coincident arrival of said pulses of said predetermined magnitude at said gating circuit, and means for recording the number of electrical pulses per unit time of a given height, said recording being made in accordance with the depth of said crystals in a well bore.

7. Apparatus for identifying the constituent elements of an earth formation traversed by a well bore comprising a housing adapted to be passed through said well bore and having a longitudinal axis, means within said housing for exciting the nuclei of constituent elements in an earth formation to transmit gamma rays of characteristic energy therefrom, means for measuring said characteristic energy comprising a pair of scintillation crystals positioned to intercept said gamma rays, said crystals being generally cylindrical and disposed adjacent to one another and with their longitudinal axes substantially in alignment with said longitudinal axis of said housing, shielding means intermediate said nuclei exciting means and said pair of crystals to exclude from both of said crystals gamma rays originating in said exciting means, photomultiplier tube means secured to the oppositely disposed end faces of said crystals and isolated optically from each other, amplifying means for each of said photomultiplier tube means for producing electrical pulses proportional in amplitude to the radiation energies absorbed by said crystals, gating circuit means for controlling the passage of electrical pulses generated in response to radiation energy absorbed in one of said crystals to a pulse-height measuring means, gating circuit operating means responsive to the arrival of electrical pulses from the amplifying means for the other of said crystals which are of predetermined magnitude, each corresponding to annihilation radiation being detected by said other crystal, means for measuring the height of each pulse from said amplifying means for the first of said crystals passed by said gating circuit upon coincident arrival of said pulses of said predetermined magnitude at said gating circuit, and means for recording the number of electrical pulses per unit time of a given height, said recording being made in accordance with the depth of said crystals in a well bore.

References Cited in the file of this patent

UNITED STATES PATENTS

| 2,349,753 | Pontecorvo | May 23, 1944 |
| 2,648,012 | Scherbatskoy | Aug. 4, 1953 |
| 2,659,011 | Youmans et al. | Nov. 10, 1953 |

OTHER REFERENCES

Two-Crystal Gamma-Ray Scintillation Spectrometer, Conally, Rev. Sci. Inst., June 1953, vol. 24, II 6 pp. 458–459.